United States Patent [19]

Bresson

[11] Patent Number: 4,586,102
[45] Date of Patent: Apr. 29, 1986

[54] TRACK NUMBER INDICATOR

[75] Inventor: Richard J. Bresson, Hamlin, N.Y.

[73] Assignee: Eastman Kodak Company, Rochester, N.Y.

[21] Appl. No.: 520,263

[22] Filed: Aug. 4, 1983

[51] Int. Cl.$^4$ .................. G11B 23/03; G11B 5/016
[52] U.S. Cl. ................................. 360/133; 360/99; 360/97; 360/86
[58] Field of Search .............. 360/133, 99, 97, 86, 360/132, 137; 354/121; 235/91 C

[56] References Cited

U.S. PATENT DOCUMENTS

| | | | |
|---|---|---|---|
| 4,264,169 | 4/1981 | Harvey | 354/121 |
| 4,511,944 | 4/1985 | Saito | 360/133 |

FOREIGN PATENT DOCUMENTS 2102188 1/1983 United Kingdom.
2101391 1/1983 United Kingdom.

OTHER PUBLICATIONS

Research Disclosure: "Means for Locking and Unlocking Rotable Film Units", pp. 65–67, Aug. 1978.

Primary Examiner—A. J. Heinz
Assistant Examiner—Benjamin Urcia
Attorney, Agent, or Firm—Roger A. Fields

[57] ABSTRACT

In a magnetic disk cartridge, a dial member is rotatable relative to the cartridge housing to a plurality of positions for indicating the number of tracks recorded on a disk surface. A resilient locking finger is connected to the dial member for engaging respective engagable means on the housing, which correspond to the various track number positions. Whenever the cartridge is removed from a recording and/or playback apparatus, the locking finger engages one of the engagable means to prevent the dial member from rotating out of the last position to which it was rotated. An access opening is provided in the housing to receive a rotational driver of the apparatus for rotating the dial member to its track number positions. The locking finger is supported for movement by the rotational driver to separate from any one of the engagable means as the driver is received through the access opening, thereby freeing the dial member for rotation by the driver.

2 Claims, 6 Drawing Figures

TRACK NUMBER INDICATOR

BACKGROUND OF THE INVENTION

1. Field of the Invention

The invention generally relates to cartridges for magnetic disks on which information may be recorded in substantially circular tracks. More particularly, the invention relates to a track number indicator in a disk cartridge for visibly indicating the number of tracks recorded on the magnetic disk.

2. Description of the Prior Art

Magnetic disks have been used for a number of years to record information in various types of devices, such as word processors and computer systems. The most common form of such disks, sometimes referred to as "floppy disks" because of their lack of stiffness, are housed in a cartridge to prevent the flexible disk from being folded or otherwise damaged and to protect the sensitive magnetic surface(s) of the disk from dust and other contaminants. The cartridge includes an exterior housing having at least one access opening through which one or more magnetic heads may be received to gain access to a magnetic surface of the disk. While the disk is rotated within the housing, the head is radially advanced over a magnetic surface of the disk to record or read information in a plurality of concentric tracks on the magnetic surface.

Generally, the magnetic disk cartridges of which I am aware do not include any means for indicating the number of tracks recorded on the magnetic disk. Recently, however, a magnetic disk cartridge having a track number indicator was disclosed in United Kingdom Patent Application GB 2,103,188A, published Jan. 26, 1983. In that cartridge, there is provided a rotatable dial member having a keyhole-shaped opening for receiving a drive pin in a disk recording and/or playback apparatus. The drive pin is incrementally rotated each time a magnetic head in the apparatus is radially advanced over the magnetic surface of the disk by a distance equal to the track pitch. The incrementally rotated pin similarly rotates the dial member relative to a housing of the cartridge to position a key-notch extension of the keyhole-shaped opening, which serves as a pointer, opposite one of a plurality of track numbers imprinted on the outside of the housing. The dial member has circumferential teeth that respectively engage a resilient detent pawl, fixed to the inside of the housing, to releasably retain the dial member in each track number position to which it is rotated. This enables the cartridge to be removed from the recording and/or playback apparatus, and set aside, without losing the correct track number indication. If the cartridge is returned to the apparatus, with the key-notch pointing to a track number other than "0", the drive pin will not be aligned with the notch because the pin is biased to an initial angular position corresponding to the "0" position of the notch. Consequently, the drive pin cannot enter the keyhole-shaped opening and will be depressed by the dial member, thereby energizing a motor in the apparatus to rotate the drive pin and radially advance the magnetic head in synchronization. When the drive pin is rotated into alignment with the key-notch, a spring will urge the pin into the keyhole-shaped opening, de-energizing the motor to leave the head positioned adjacent the same track number on the magnetic disk as that indicated by the notch.

While the disk cartridge disclosed in the published patent application includes a means for indicating the number of tracks recorded on the magnetic disk, such means imposes a significant load on the drive motor in the disk recording and/or playback apparatus because of the continuous engagement between the resilient pawl and the respective teeth on the dial member. The pawl-tooth engagement must be relatively strong to prevent the dial member from being rotated by the drive pin whenever the drive pin is depressed by the dial member and rotated to seek alignment with the key-notch. Conversely, the drive motor must provide sufficient torque to overcome such pawl-tooth engagement in order to rotate the dial member stepwise to its various track number positions.

As the dial member in the disk cartridge is rotated to its respective track number positions, the movement of its teeth flexes the resilient pawl to momentarily remove the pawl from between adjacent pairs of the teeth. Consequently, not only is a significant load imposed on the drive motor, but such load varies in strength, which can present other problems. Moreover, whenever the cartridge is removed from the recording and/or playback apparatus, the pawl-tooth engagement does not positively prevent the dial member from being rotated, such as by inadvertently manipulating it; in which instance, the correct track number indiction could be lost.

SUMMARY OF THE INVENTION

The invention solves the above-described problems by providing a magnetic disk cartridge having a track number indicator that, by comparison, imposes a relatively insignificant, constant load on the drive motor in a disk recording and/or playback apparatus. Moreover, the track number indicator includes a locking device that prevents possible loss of the correct track number indication. Specifically, the invention provides in a magnetic disk cartridge of the type wherein (a) a housing contains a magnetic disk, (b) a head-access opening is included in said housing to receive a magnetic head for recording and/or reading information in substantially circular tracks on said disk, (c) a dial member is rotatable relative to said housing to a plurality of positions for indicating the number of tracks recorded on said disk, and (d) a driver-access opening is included in said housing to receive a rotational driver, such as a drive pin, for rotating said dial member to its track number positions, the improvement comprising:

respective engagable means, preferably on said housing, corresponding to the track number positions of said dial member;

locking means, preferably connected to said dial member, for engaging said respective engagable means to positively prevent said dial member from rotating out of its various positions; and means supporting said locking means for movement by the rotational driver to separate from said respective engagable means as the rotational driver is received through said driver-access opening, whereby the driver will maintain said locking means disengaged from said engagable means.

According to the invention, the locking means (connected to the dial member) is disengaged from any one of the engagable means (on the housing) before the rotational driver can be completely positioned to rotate the dial member. Consequently, the locking means will be free to rotate with the dial member relative to the housing, preventing any extra load from being imposed on the drive motor as in the prior art. Moreover, the engagement between the locking means and the respective engagable means positively prevents the dial member from being rotated, thereby preventing a possible loss of the track number indication as in the prior art.

Preferably, the dial member has a central hole which opens into the driver-access opening in the housing to receive the rotational driver. The locking means extends across the central hole to permit its displacement by the rotational driver to disengage from any one of the engagable means.

BRIEF DESCRIPTION OF THE DRAWINGS

The invention will be described with respect to the drawings, wherein.

DESCRIPTION OF THE PREFERRED EMBODIMENT

Figure 1:
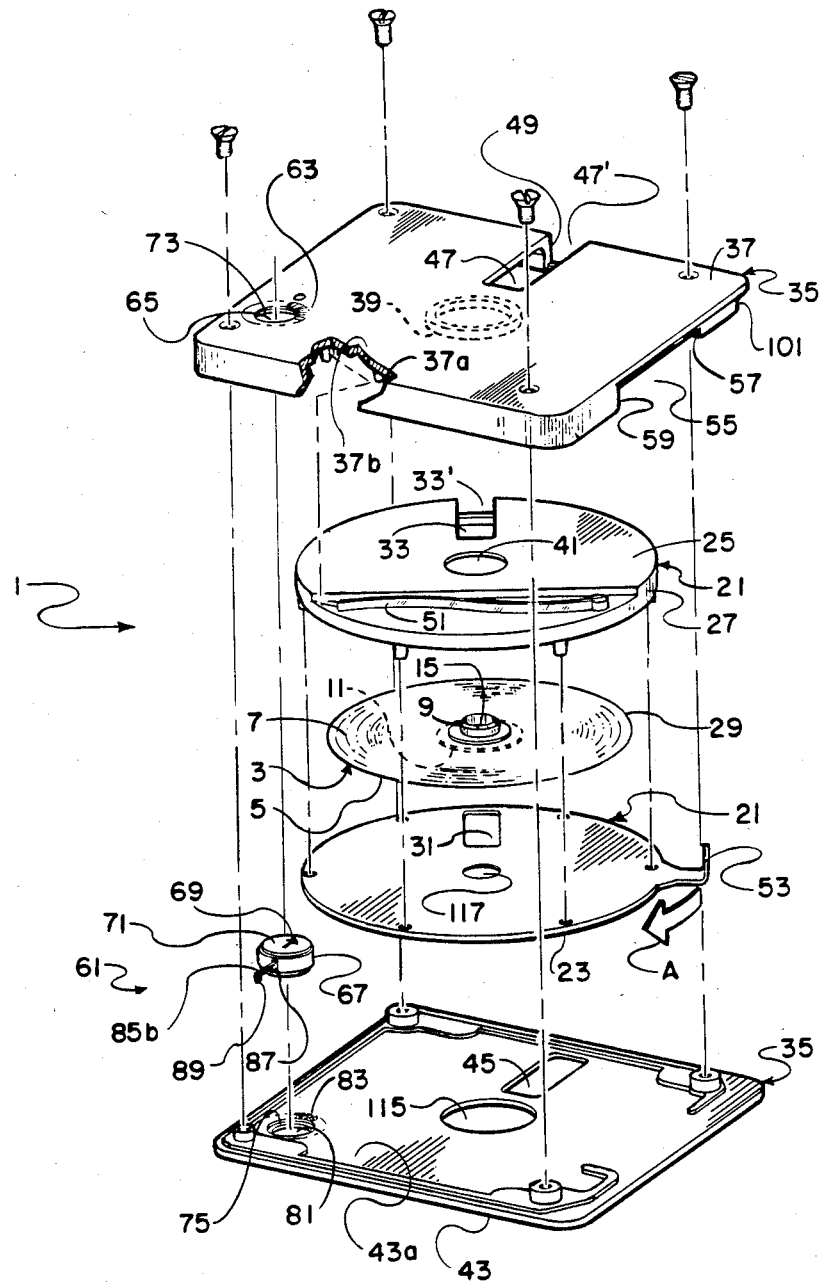
FIG. 1 is an exploded perspective view of a magnetic disk cartridge, including an improved track number indicator according to a preferred embodiment of the invention.
Figure 3:
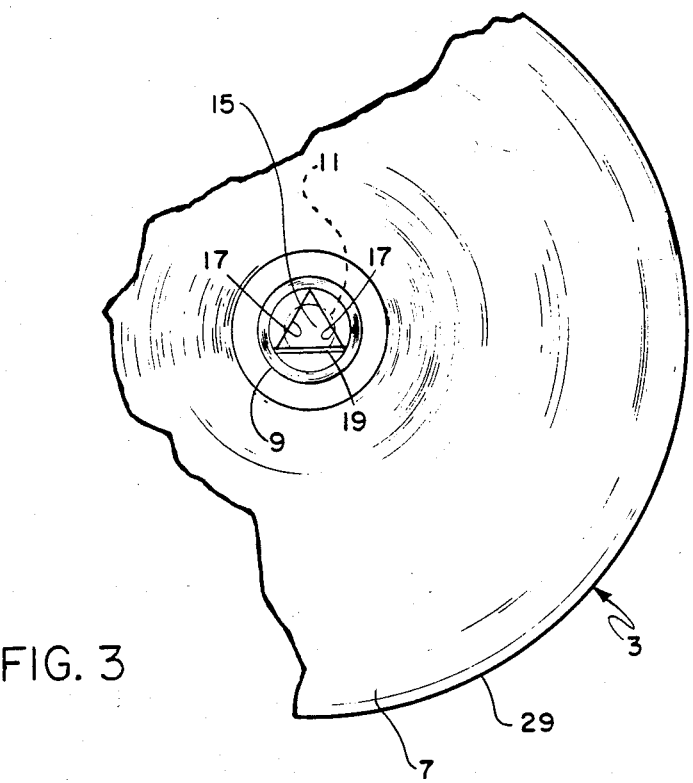
FIG. 3 is a plan view of the hub configuration of the magnetic disk.
Figure 2:
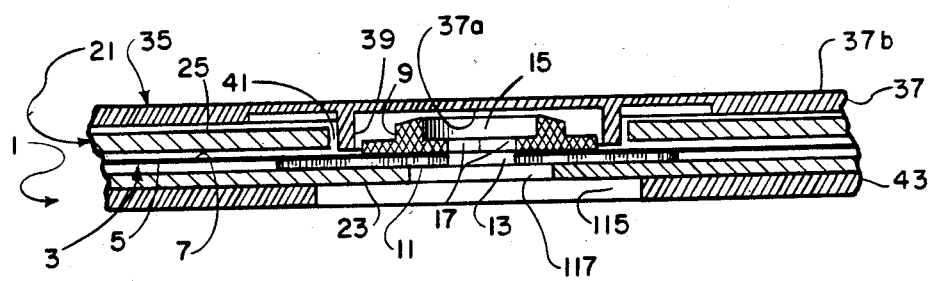
FIG. 2 is a sectional view of a central portion of the disk cartridge.

Referring now to the drawings, FIGS. 1 and 2 show a magnetic disk cartridge 1 intended for use in a disk recording and/or playback apparatus. The cartridge 1 includes a flexible disk 3 having a planar magnetic-coated surface 5, on which information may be recorded in substantially concentric tracks, and a planar support surface 7. A rotation hub 9 and an annular element 11, coaxially arranged with respect to a central hole 13 in the disk 3, are fixed to the respective planar surfaces 7 and 5 of the disk, as shown in FIG. 2. The hub 9 has a hole 15 for receiving a drive shaft in the recording and/or playback apparatus to rotate the disk 3. A pair of angled positioning edges 17, shown in FIG. 3, are arranged within the hole 15 to tangentially contact the circular periphery of the drive shaft for centering the disk 3 relative to the axis of the drive shaft. A resilient chordal element 19 extends across the hole 15, opposite the two positioning edges 17, to hold the drive shaft firmly against both of the positioning edges.

A rigid protective envelope 21 is provided to enclose the disk 3 in a cylindrically-shaped chamber, and the envelope is dimensioned to allow the disk to freely rotate within the chamber. As shown in FIGS. 1 and 2, the envelope 21 includes a pair of substantially parallel circular-shaped face walls 23 and 25, each having a similar size diameter, which is slightly larger than the diameter of the disk 3. The two face walls 23 and 25 generally cover the respective surfaces 5 and 7 of the disk 3, but they are slightly spaced from such surfaces. A substantially continuous side wall 27 of the envelope 21, encircling the circumferential edge 29 of the disk 3, connects the face walls 23 and 25, as shown in FIG. 1. The face walls 23 and 25 have respective openings 31 and 33, which are aligned in a radial sense relative to the disk 3 to provide limited access to its magnetic and support surfaces 5 and 7, for example, for a magnetic head and a back-up plate in the disk recording and/or playback apparatus. The access opening 31 to the magnetic surface 5 radially extends lengthwise to separate locations opposite the inner and outer effective limits of the annular recording area on the magnetic surface. The access opening 33 to the support surface 7 similarly extends inwardly the same distance as the access opening 31, but extends outwardly a greater distance to the side wall 27 of the envelope 21, forming an opening 33' in the side wall.

A rigid rectangular-shaped housing 35 encloses the envelope 21 and is dimensioned to allow the envelope to rotate within the housing. As viewed in FIGS. 1 and 2, a top wall 37 of the housing 35 includes, on its inside surface 37a, an integrally-formed, centered, tubular-like member 39. The tubular-like member 39 extends into a central opening 41 in the face wall 25 of the envelope 21 to support the envelope for rotation relative to the housing 35 substantially about the same axis as that of the disk 3. The rotation hub 9 of the disk 3 is located within the tubular-like member 39 to loosely support the disk for rotation.

A bottom wall 43 of the housing 34 and the top wall 37 of the housing, as viewed in FIG. 1, have respective openings 45 and 47, which are normally out of registration with the access openings 31 and 33 in the face walls 23 and 25 of the envelope 21 in order to be closed by the face walls. The respective openings 45 and 47 correspond substantially in size and arrangement to the access opening 31 and 33. For example, the opening 47 in the top wall 37 of the housing 35 forms an opening 47' in a side wall 49 of the housing 35, in the same way that the access opening 33 in the face wall 25 of the envelope 21 forms the opening 33' in the side wall 27 of the envelope. A return spring 51 has one end fixed to the face wall 25 of the envelope 21 and another end fixed to the inside surface 37a of the top wall 37 of the housing 35. A tab 53, integrally formed with the face wall 23 of the envelope 21, extends through a side slot 55 in the housing 35. The spring 51 ordinarily maintains the access openings 31 and 33 (33') in the envelope 21 displaced from the respective openings 45 and 47 (47') in the housing 35, by urging the envelope to rotate in a direction opposite to that indicated by the arrow A until the tab 53 is abutted against a stop 57 at one end of the side slot 55. When the tab 53 is moved in the direction of the arrow A until it abuts against a stop 59 at the other end of the side slot 55, the envelope 21 will be rotated in the same direction to position the access openings 31 and 33 (33') substantially in registration with the respective openings 45 and 47 (47'). Then, a magnetic head and a back-up plate, for example, may be admitted through such registered openings to the magnetic and support surfaces 5 and 7 of the disk 3.

The Track Number Indicator

Figure 4:
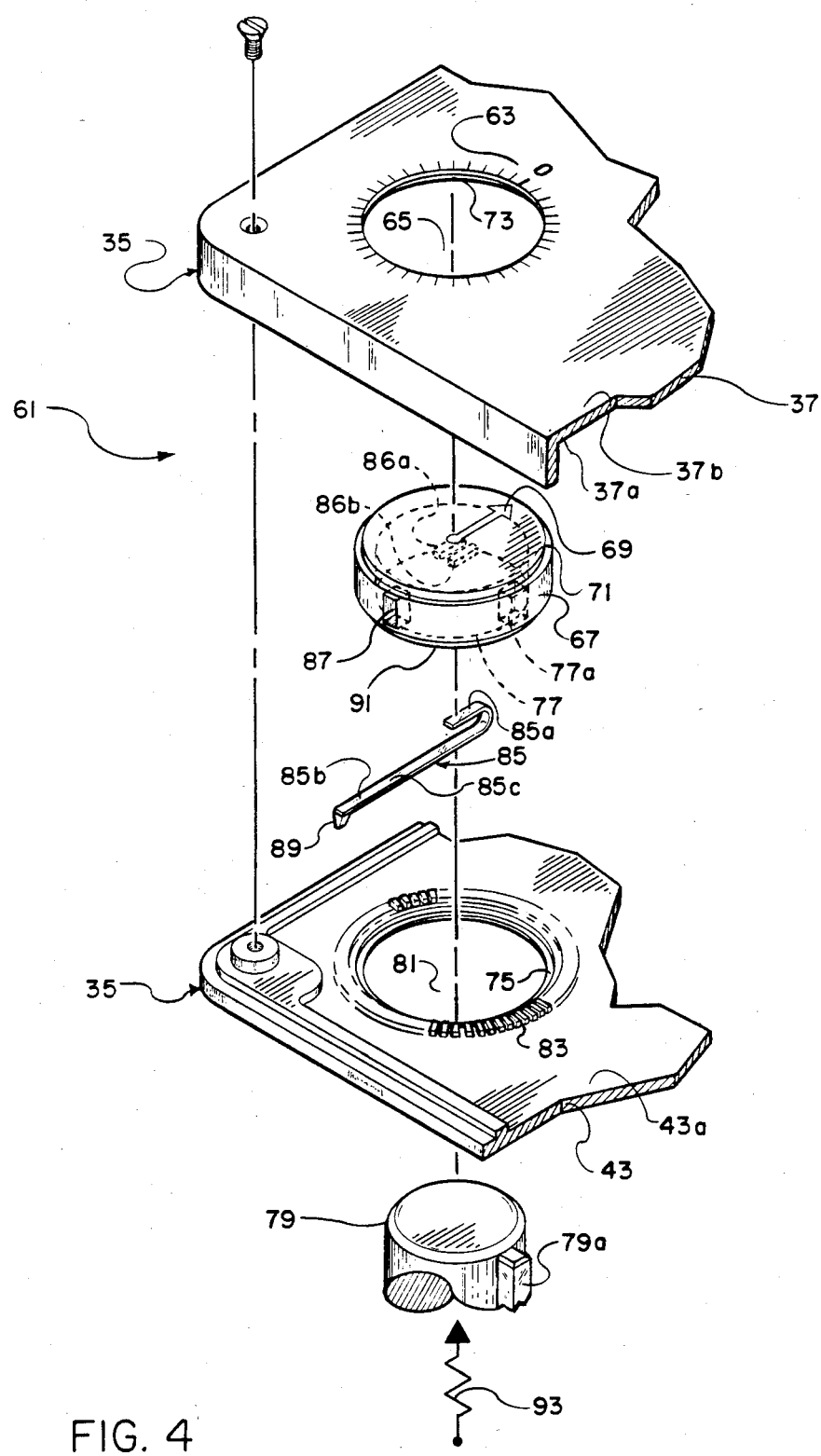
FIG. 4 is an exploded perspective view of the track number indicator.

Indicator means is provided in the cartridge 1 to display an indication of that portion of the annular recording area on the magnetic surface 5 of the disk 3 on which information has been recorded or, alternatively, that portion of the annular recording area which remains available for recording. In the preferred embodiment, the indicator means is a track number indicator 61 for visibly indicating the number of concentric tracks in which information has been recorded on the disk surface 5. As shown in FIGS. 1 and 4, the indicator 61 includes a track number scale 63 arranged in a circle, on the outside surface 37b of the top wall 37 of the housing 35, about an opening 65 in the top wall. A tubular-like dial member 67, longitudinally extending between the top and bottom walls 37 and 43 of the housing 35, has an integral pointer on 69 its top face 71. The dial face 71 is located in the opening 65, flush with the outside surface 37b of the top wall 37, to permit the pointer 69 to point to an indication on the scale 63 that represents the number of tracks recorded on the disk surface 5.

Figure 5:
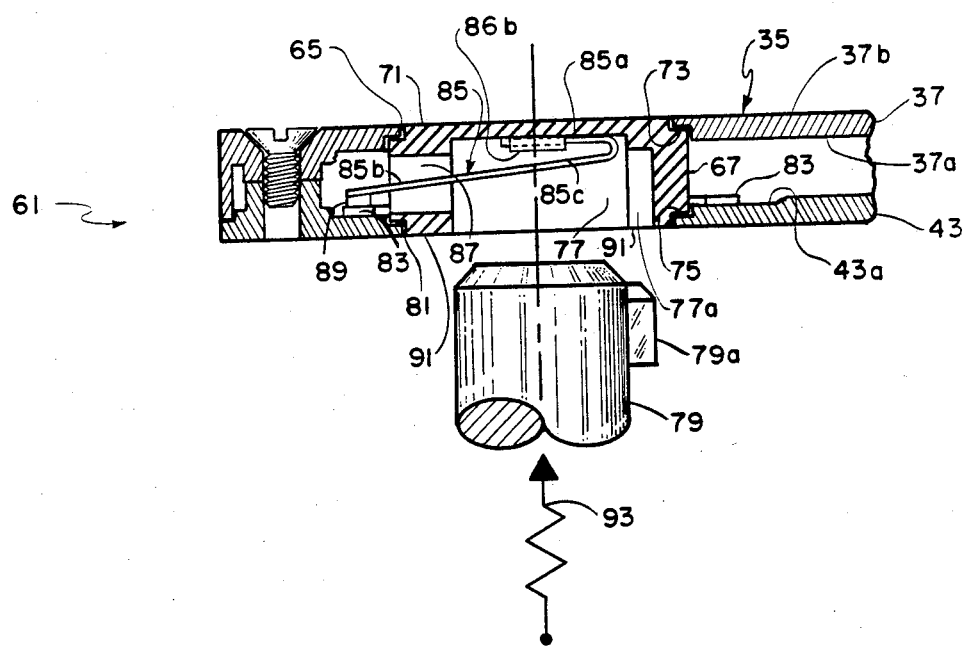
FIG. 5 is a sectional view of the track number indicator.

Respective annular bearings 73 and 75 in the top and bottom walls 37 and 43 of the housing 35, as shown in FIG. 5, support the dial member 67 for rotation relative to the housing to a plurality of positions for indicating the number of tracks recorded on the disk surface 5. In the preferred embodiment, therefore, the pointer 69 is rotated with respect to the scale 63 to provide the track number indication. Alternatively, the scale 63 may be located on the dial face 71 and the pointer 69 located on the outside surface 37b of the top wall 37, for rotation of the scale with respect to the pointer to provide the track number indication.

Preferably, the track number scale 63 has consecutive even numbers, with markings between the respective numbers, to provide a numerical indication of the number of tracks recorded on the disk surface 5. As one example, the disk surface 5 may have a recording capacity of fifty tracks. In which instance, the scale 63 would be numbered "0, 2, 4, 6 . . . 50", with markings between the respective numbers.

As shown in FIGS. 4 and 5, the dial member 67 has a keyhole-shaped opening 77, concentrically arranged about its axis of rotation, for receiving a mating drive pin 79 in the disk recording and/or playback apparatus through an opening 81 in the bottom wall 43 of the housing 35. The drive pin 79 is incrementally rotated each time a magnetic head in the apparatus is radially advanced over the magnetic surface 5 of the disk 3 by a distance equal to the track pitch. The incrementally rotated pin 79 similarly rotates the dial member 67 relative to the housing 35 to position the pointer 69 opposite the particular number or marking on the scale 63 that indicates the recording track on the disk surface 5 to which the magnetic head is radially advanced.

A plurality of teeth 83 are integrally formed on the inside surface 43a of the bottom wall 43 of the housing 35, as shown in FIG. 4, in a circle about the opening 81 in the bottom wall. The teeth 83 define interdental spaces, which correspond to the respective track number positions of the dial member 67. A resilient pawl spring 85 has one end portion 85a fixed to the dial member 67 between a pair of spaced supports 86a and 86b, within the keyhole-shaped opening 77, as shown in FIGS. 4 and 5, and another end portion 85b extending out of a window 87 in the dial member. The end portion 87b has a pawl nose 89 which is urged by the pawl spring 85 into the respective spaces between the teeth 83 to lock the dial member 67 in any one of its track number positions by positively preventing its rotation. This enables the cartridge 1 to be removed from the disk recording and/or playback apparatus, and set aside, without losing the correct track number indication. That is, the dial member 67 will be prevented from rotating whenever the cartridge 1 is handled or should it be jarred, such as by dropping it.

If the cartridge 1 is returned to the disk recording and/or playback apparatus, with the pointer 69 pointing to a track number other than "0", the drive pin 79 will not be aligned with the keyhole-shaped opening 77 because the pin is biased in such apparatus to an initial angular position corresponding to the "0" position of the pointer. That is, the key portion 79a of the drive pin 79 will have an angular position which is different than the angular position of the mating notch portion 77a of the keyhole-shaped opening 77. Consequently, the drive pin 79 cannot enter the keyhole-shaped opening 77 and will be depressed by an annular surface 91 on the bottom side of the dial member 67, thereby energizing a motor in the apparatus to rotate the drive pin along the angular surface and to radially advance a magnetic head in such apparatus in synchronization. When the drive pin 79 is rotated into alignment with the keyhole-shaped opening 77, a spring 93 will urge the pin into the opening, de-energizing the motor to leave the head positioned adjacent the same track number on the magnetic surface 5 of the disk 3 as that indicated by the pointer 69.

The engagement of the pawl nose 89 with an adjacent pair of the teeth 83 is strong enough to prevent the drive pin 79 from rotating the dial member 67. As shown in FIG. 5, an elongate intermediate portion 85c of the pawl spring 85 extends diagonally across the keyhole-shaped opening 77 in the dial member 67, crossing such member's axis of rotation. When the drive pin 79 is received in the keyhole-shaped opening 77 to the extent that the key portion 79a enters the notch portion 77a, it will displace the intermediate portion 85c of the pawl spring 85 by raising the intermediate portion toward the pair of supports 86a and 86b. This lifts the pawl nose 89 completely out of one of the respective spaces between the teeth 83, unlocking the dial member 67 for rotation by the drive pin 79.

According to the invention, therefore, the pawl nose 89 is separated from the teeth 83 before the drive pin 79 is completely positioned to rotate the dial member 67. Moreover, the pawl nose 89 will remain separated from the teeth 83 during rotation with the dial member 67, preventing any extra load from being imposed on the drive motor for the drive pin as in the prior art.

Operation

Figure 6:
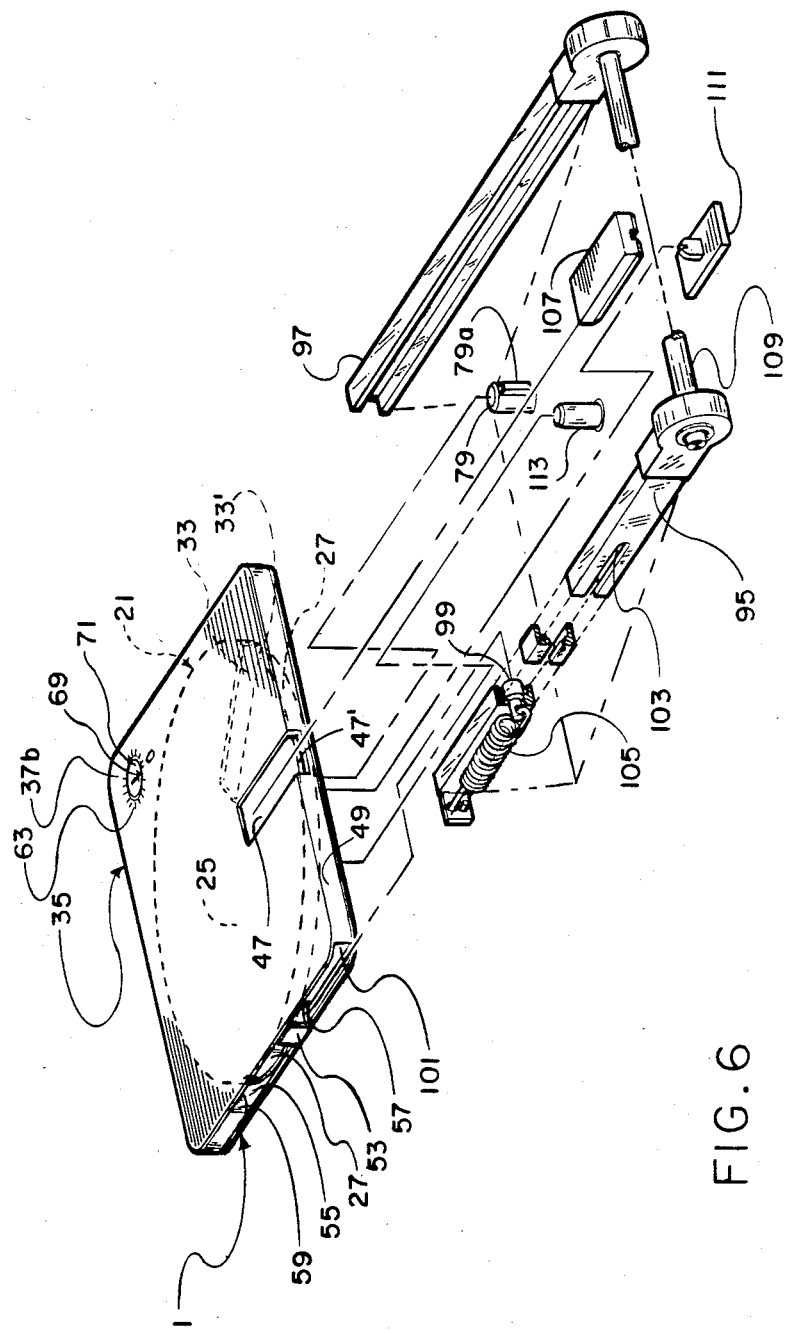
FIG. 6 is a schematic perspective view of the disk cartridge and a cartridge-loading assembly in a disk recording and/or playback apparatus.

FIG. 6 shows the manner in which the disk cartridge 1 may be inserted in a cartridge-loading assembly of a disk recording and/or playback apparatus. When the cartridge 1 is slid into a pair of substantially parallel, u-shaped channels 95 and 97, a boss 99, located on the inside surface of the channel 95, will first enter a guide groove 101 in the housing 35 and will then swing the tab 53 along the side slot 55 in the housing from the stop 57 to the stop 59. Thereupon, the envelope 21 will be rotated relative to the housing 35 to position the access openings 31 and 33 (33') in the envelope substantially in registration with the respective openings 45 and 47 (47') in the housing. With continued movement of the cartridge 1 in the channels 95 and 97, the tab 53 (against the stop 59) will depress the boss 99 along a support slot 103 in opposition to the urging of a return spring 105. Then, final movement of the cartridge 1 in the channels 95 and 97 will cause a back-up plate 107, fixed with the channels to the underside of a case cover, not shown, to be radially received, through the registered openings 47' and 33', into the registered openings 47 and 33. Releasable means, not shown, may be provided for securing the cartridge in place.

When the case cover with the cartridge 1 secured in place is pressed downward, as viewed in FIG. 5, it will pivot about a supporting rod 109 until the cartridge comes to rest atop a base plate, not shown. As the case cover is pressed downward, a magnetic head 111 movably supported on the base plate will be inserted into the registered openings 31 and 45, shown in FIG. 1. The drive pin 79, which projects from an opening in the base plate, will be inserted through the access opening 81 in the bottom wall 43 of the housing 35 into the keyhole-shaped opening 77 in the dial member 67 (assuming that the dial member is in its "0" track number position.) And a drive spindle 113 projecting from an opening in the base plate will be inserted into the hole 15 in the hub 9 of the disk 3. As shown in FIG. 1, the bottom wall 43 of the housing 35 and the face wall 23 of the envelope 21 have respective central openings 115 and 117 for admitting the drive spindle 113 into the hole 15 in the hub 9.

The invention has been described in detail with reference to a preferred embodiment, but it will be understood that variations and modifications can be effected within the spirit and scope of the invention.

I claim:

1. In a magnetic disk cartridge of the type wherein (a) a housing contains a magnetic disk, (b) a head-access opening is provided in said housing to receive a magnetic head for recording and/or reading information in substantially circular tracks on said disk, (c) a dial member is rotatable relative to said housing to a plurality of positions for indicating the number of tracks recorded on said disk, and (d) a driver-access opening is provided in said housing to receive a rotational driver for rotating said dial member to its track number positions, the improvement comprising:

respective engagable means corresponding to the track number positions of said dial member, said engagable means being arranged within said housing concentrically about said driver-access opening;

resilient locking means connected to said dial member and biased for engaging said respective engagable means to positively prevent said dial member from rotating out of a corresponding track number position; and means supporting said locking means across said driver-access opening for displacement by the rotational driver to separate said locking means from said respective engagable means as the rotational driver is received through said driver-access opening, whereby the driver will maintain said locking means separated from said engagable means during rotation of said dial member.

2. The improvement as recited in claim 1, wherein said dial member has a central opening which opens into said driver-access opening to receive the rotational driver and has a window between said central opening and said respective engagable means, and said locking means includes an elongate resilient member having one end portion connected to said dial member within said central opening for rotation of said resilient member with said dial member and another end portion extending extending out of said window for engagement with any one of said engagable means.

* * * * *